(12) United States Patent
Hayoun

(10) Patent No.: US 6,279,757 B1
(45) Date of Patent: Aug. 28, 2001

(54) SYSTEM AND A SUPPORT AND STORING DEVICE FOR CD'S

(76) Inventor: Ari Maurice Hayoun, Kibbutz Galuyot Street 27/1, 77350, Ashdod (IL)

( * ) Notice: Subject to any disclaimer, the term of this patent is extended or adjusted under 35 U.S.C. 154(b) by 0 days.

(21) Appl. No.: 09/367,336

(22) PCT Filed: Feb. 12, 1998

(86) PCT No.: PCT/IL98/00072

§ 371 Date: Nov. 12, 1999

§ 102(e) Date: Nov. 12, 1999

(87) PCT Pub. No.: WO98/35593

PCT Pub. Date: Aug. 20, 1998

(30) Foreign Application Priority Data

Feb. 12, 1997 (IL) .......................................... 120204

(51) Int. Cl.⁷ ...................................................... A47F 7/00
(52) U.S. Cl. ........................... 211/40; 211/41.12; 211/73; D6/407
(58) Field of Search .................................. 211/40, 41.12, 211/73, 41.1, 41.13, 41.14, 20.1; D6/407; 206/308.1, 454, 455, 456, 564

(56) References Cited

U.S. PATENT DOCUMENTS

| | | |
|---|---|---|
| D. 132,201 | 4/1942 | Slough . |
| D. 374,582 | 10/1996 | Chu . |
| 1,974,674 | 9/1934 | Halladay et al. ........................ 206/65 |
| 2,431,535 | 11/1947 | Bergstrom . |
| 3,856,137 | 12/1974 | Brindley . |
| 4,181,220 | 1/1980 | Zicko ................................ 206/315 R |
| 4,485,922 | 12/1984 | Desmond et al. . |
| 4,505,393 | 3/1985 | Fleigle et al. . |
| 5,161,682 | 11/1992 | Seifert et al. ......................... 206/309 |
| 5,255,785 | 10/1993 | Mackey . |
| 5,713,462 | 2/1998 | Hansen .................................. 206/308 |

FOREIGN PATENT DOCUMENTS

| | | |
|---|---|---|
| 92 16 740 | 5/1993 | (DE) . |
| 44 09 592 | 9/1994 | (DE) . |

*Primary Examiner*—Robert W. Gibson, Jr.
(74) *Attorney, Agent, or Firm*—Crowell & Moring, L.L.P.

(57) ABSTRACT

The present invention relates to a system and a support and device for compact discs utilizing the system. The device is made of thin flexible material such as cardboard, plastic or thin metal sheets being modular and collapsible. The device is in accordance with the standard sizes of the CD package, however, it would store also double and triple albums without making any changes. Due to its versatility it could also be used for video cassettes and similar objects.

15 Claims, 11 Drawing Sheets

SYSTEM AND A SUPPORT AND STORING DEVICE FOR CD'S

TECHNICAL FIELD

The present invention relates to a system and a support and storing device for compact discs (hereinafter "CD") utilizing the system. The device is made of thin flexible material such as cardboard, plastic or thin metal sheets being modular and collapsible.

The device is in accordance with the standard sizes of the CD's package, however, it would store also various thickness CD albums. Due to it's Versatility it could also be used for storing video cassettes, and other objects like writing instruments.

BACKGROUND ART

A Search report by the International Searching Authority, from the Commissioner of Patents and Trademarks Office in Washington D.C. disclosed the following patents:
U.S. Pat. No. 4,485,922 A (DESMOND et al) Dec. 4, 1984 (Dec. 4, 1984)
U.S. Pat. No. 4,505,393 A (FLEIGLE et al) Mar. 19, 1985 (Mar. 19, 1985)
U.S. Pat. No. D132,201 A (SLOUGH) Apr. 28, 1942 (Apr. 28, 1942)
U.S. Pat. No. 2,431,535 A (BERGSTROM) Nov. 25, 1947 (Nov. 25, 1947)
U.S. Pat. No. 3,856,137 A (BRINDLEY) Dec. 24, 1974 (Dec. 24, 1974)
U.S. Pat. No. D374,582 A (CHU) Oct. 15, 1996 (Oct. 15, 1996)

The prior art does not teach or suggest a support or storage device for compact discs made of a plurality of blanks of flexible material with scores, cuts and holes, and storage space to hold various thickness compact disc albums.

None of the prior art patents uncovered in the search, discloses a device including connecting means and storing slots on inclined external end panels with holes related to intervals, to provide various integrated storage aeras or to suggest a trans-axial and/or longitudinal extension of the said storing areas.

DISCLOSURE OF INVENTION

It is the object of the present invention to provide a modular system and storing device which would enable connection to two or more devices in a convenient manner.

It is a further object of the present invention to provide a storing system and device adapted to store the standard size of CD's but that would also store various thickness CD albums.

It is yet a further object of the present invention to provide a system and device which would include cuts, holes and slots at certain locations, on certain inclined panels of the device, combining the storage of CD's with a convenient manner of displaying writing instruments such as pens, as well as to provide an integrated corridor-space for the convenient passage of connecting wires.

It is a further object of the present invention to provide a system and device which could be flattened when not in use.

It is a further object of the present invention to provide a system and storing device of simple and inexpensive construction.

It is yet a further object of the present invention to provide a modular storing system and device which could be used as an advertising means and have further use as will become apparent from the following description.

The device according to the invention would also enable convenient access to the each disc separately, as the discs or cassettes could be stored or placed in different positions.

This invention further provides a system for erecting, storing and supporting CD's made of different blanks connected to each other.

BRIEF DESCRIPTION OF DRAWINGS

The invention will now be described with reference to the annexed drawings in which.

BEST MODE FOR CARRYING OUT THE INVENTION

Figure 13:
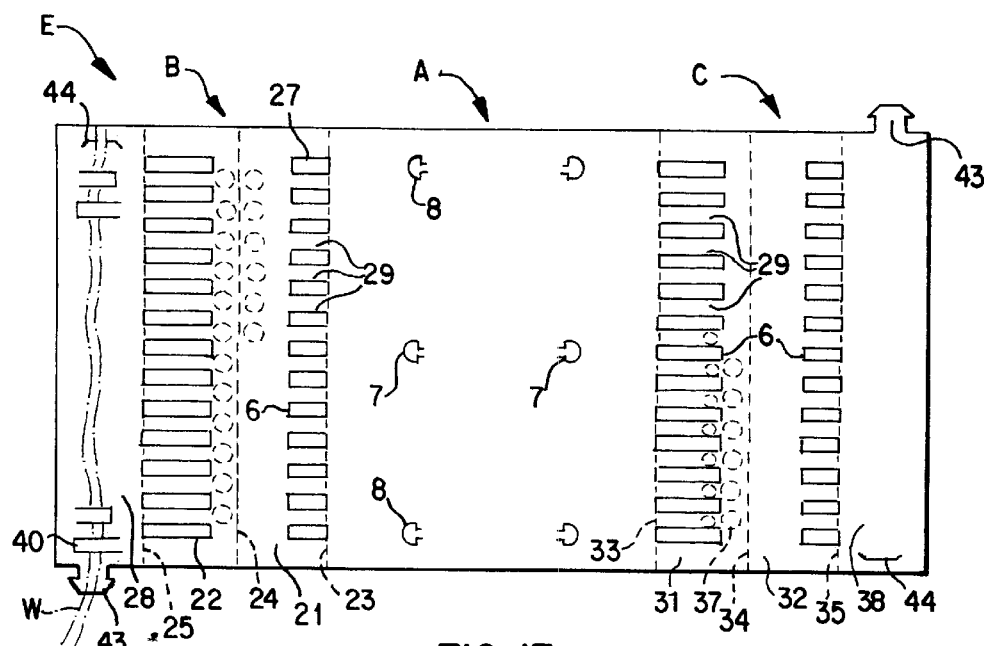
Figure 15:
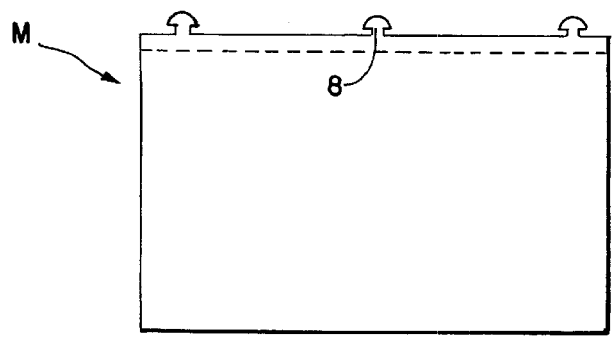
FIG. 15 is a top view of an computer's mouse pad.

Turning first to FIG. 13 which is an embodiment of a foldable and connectable blank E basically comprising the necessary elements to demonstrate the invention, particularly:

1) A central section A being the bottom part of the device to be formed, and provided with cuts 7 and 44, and stabilizing tongues 8 as well as scores 23 and 33 at opposite sides;
2) A side section B, foldably and longitudinally joined to section A by score 23 and comprising three parallel structural panels 21,22 and 28 preferably of a basic rectangular size, respectively and foldably joined by scores 24 and 25;
3) A Side section C, foldably and longitudinally joined to central section A by score 33 and comprising three parallel structural panels 31, 32 and 38 preferably of a basic rectangular size, respectively and foldably joined by scores 34 and 35.

It will be seen that sections B and C can be alternately of optional use. It will be seen that its utilization depends on whether the storage areas of the device are to be ended or not. Panel 21 is an inclined external end-side wall structural panel which may include a plurality of trans-axially disposed, longitudinally spaced, parallel CD receiving slots 6, preferably sized to adapt to the best standard CD's thickness (hereinafter "CD slots"). Said CD slots could be of identical dimensions whenever present on any panel. When the upper side of the CD slots is not cut, they will be provided with springy tongues intended to provide a certain amount of pressure on the sides of the vertically inserted CD's as seen in FIG. 2, 3, 4 and 14. CD slots of an inclined panel like 21 are aligned with CD slots of foldably joined, adjacent panel like 22 and are preferably partly extending from bottom longitudinal edge 23 towards to upper longitudinal edge 24. Panel 21 may also include one or more longitudinally spaced, preferably rounded pen receiving holes of best common standard size to hold pens, highlighters, pencils and the like but could also be of different sizes and forms that could adapt in the intervals between the CD slots, preferably located at the upper part therein, near upper edge 24.

It will also be seen that panel 22 is an internal side structural panel foldably joined and oppositely inclined to panel 21 and comprising as well a plurality of said CD slots which may partly extend from bottom longitudinal edge, score 25, towards upper longitudinal edge, score 24. When present On any panel, the parallel intervals between the CD slots are preferably of same said standard CD's thickness to admit inclined inserted CDs which will lay in an inclined position on upper edge 24 between vertically inserted CDs. CD slots of external panel 21 are intended to cooperate with another CD slots on the oppositely inclined panel of the next trans-axially connected blank to provide CD storage.

Figure 14:
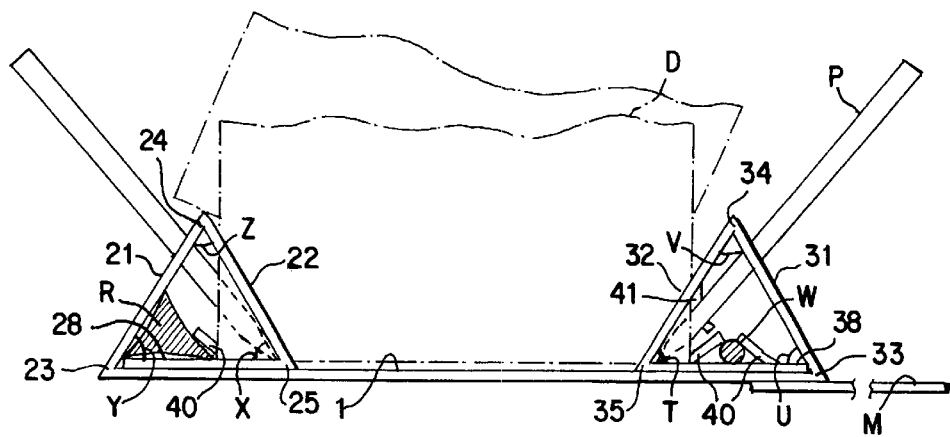
FIG. 14 is a side view of a device made of a blank connected to a computer mouse pad and comprising five different storage areas.

Panel 28 includes connecting tongue 43 and connecting cut 44 and could also include additional tongues 40 for securing connecting wires and other writing instruments or office accessories like rollers and the like seen in FIG. 14.

Still referring to FIG. 13, it will be seen that the respective panels 21, 22 and 28 of side section B, as well as 31, 32 and 38 of side section C may be folded towards the central section A in two inwardly opposite folding sequences to provide an erected triangularly formed structure at each side end of the said central section A. When appropriate only one of the two side sections will be folded and raised to a supporting device.

Starting with side section B, the first sequence including three consecutive folding steps and one stabilizing operation will have to take place.

Still referring to FIG. 13, it will be seen that panels 21, 22 and 28 of side section B, will be folded towards the central section A in an inwardly folding sequence of three consecutive folding steps to provide an erected triangularly formed structure at one side end of the said central section A.

The first folding step will take place by raising and inwardly folding structural panel 28 along score 25 towards central section A, to a raised and internally inclined position so that its upper face presents an acute and preferably approximate sixty degrees angle X in relation to the upper face of adjacent foldably joined panel 22, as seen in FIG. 14.

A second and consecutive folding step will take place as both structural panels 28 and 22, being kept in their resulted folded position will now be inwardly folded towards central section A along scoring line 24, to present a second and internal angle Z preferably of sixty degrees or more between the internal faces of panels 22 and 21 creating thereby another acute angle of an approximate sixty degrees position or less between the internal faces of panels 28 and 21, therefore bringing the longitudinal end edge of panel 28 near scoring line 23.

A third folding step takes place as panels 28,22, and 21, being kept in their triangular resulted position will now be, inwardly folded, as a unit, along scoring line 23, towards section A, the external bottom face of panel 28 thereby brought to a resulted face-to-face and laying position with the upper face of the nearest part of the section A, and the longitudinal end edge of said panel 28 pointing towards the internal folded corner along longitudinal scoring line 23, between structural panel 21 said part of section A panel.

It will be seen that an internal triangular relationship has been thereby established between upper faces of panels 28,22, and 21 and that the more acute the angle X and Y will be the bigger the integrated surface space will be created inside the longitudinal corridor-space area for the storage of objects like connecting wires or other office accessories purposes.

Once the first folding sequence is completed, folded line 25 and three CD slots cells on panel 22 are positioned near three tongues 8 on central section panel A. Tongues 8 have to be introduced into the lowest part of the slots facing them for the adequate stabilization of the raised structure at one side of the blank (hereinafter "first mounted blank").

Figure 2:
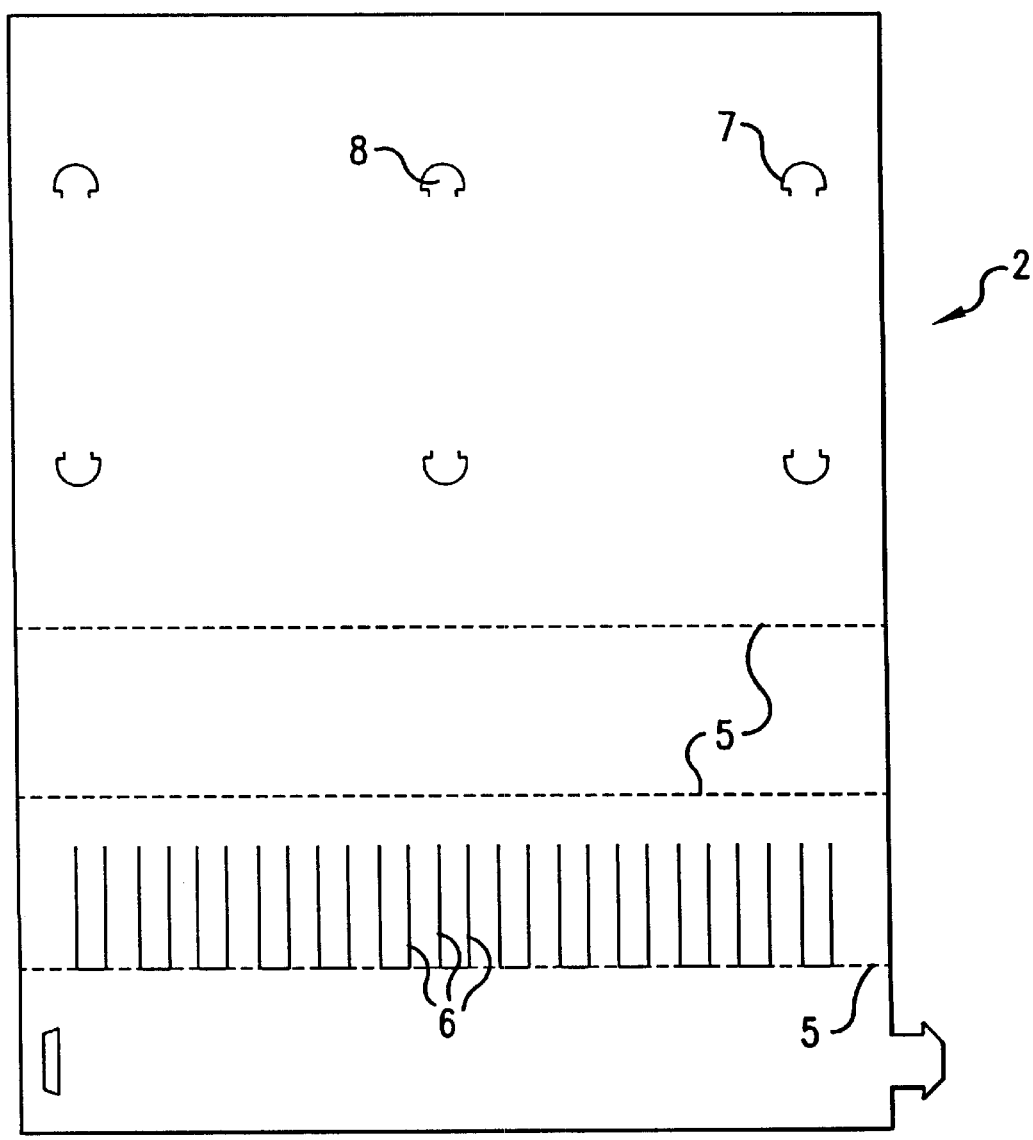
Figure 4:
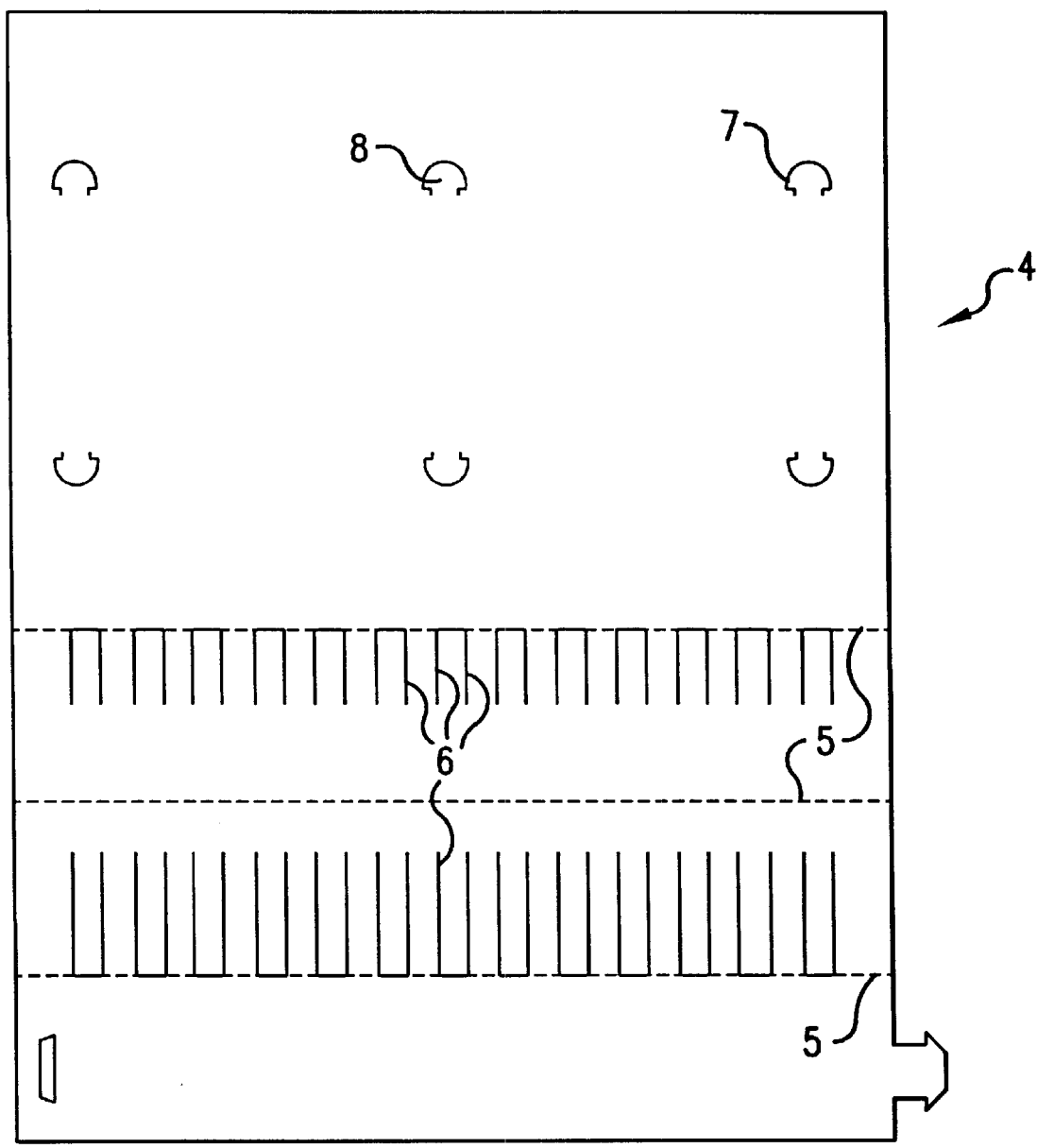
Figure 5:
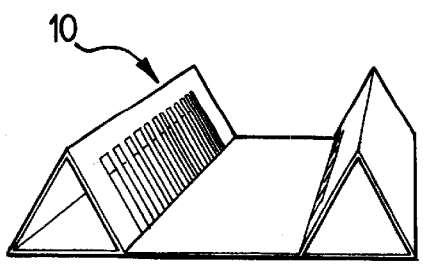
FIG. 5 is a perspective illustration of a single support.

When a second connectable blank of the character described above, having been similarly mounted and stabilized as described (hereinafter "second mounted blank") is being trans-axially connected to the first mounted blank, the bottom face of the second mounted blank is placed upon the upper face of the first mounted blank, the three still free tongues 8 of the first mounted blank shall be introduced into the lower part of the CD slots on panel 21 of the second mounted blank, providing therefore one central storing area for CD's, and four additional storage spaces for writing accessories and connecting wires. Side section C of the first mounted blank laying under the second mounted blank may be left flat unfolded under the first mounted blank or detached along score 33. FIG. 2 and FIG. 4 show a blank including only section C and section A. FIG. 14 illustrates said storage spaces when the two side sections, B and C, are mounted.

When an additional connectable, similarly mounted blank of the character described above, is to be trans-axially connected to the previously mounted blanks a similar connecting operation as described is systematically repeated by means of placing the bottom face of said third mounted blank upon the upper face of the second mounted blank, the three still free tongues 8 of said second blank shall be introduced into the lower part of the CD slots on panel 21 of the third mounted blank, as many times as necessary.

Figure 9:
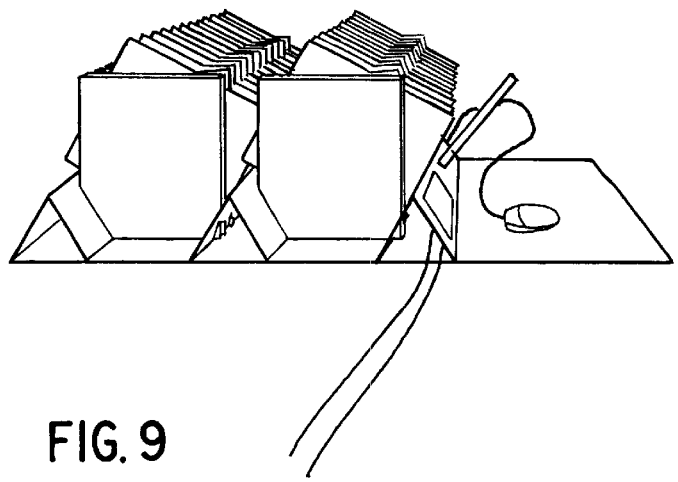
FIG. 9 illustrates a support and an embodiment of use with a computer mouse-pad and a crossing through connecting wire.

When a third connectable mounted blank of the character described above, is being trans-axially connected to the second mounted blank by means of placing the bottom face of said third mounted blank upon the upper face of the second mounted blank, the three still free tongues 8 of said second blank shall be introduced into the lower part of the CD slots on panel 21 of the third mounted blank, providing therefore additional storage spaces as well as connecting means and structures for additional connectable blanks to store writing accessories and connecting wires as demonstrated in FIG. 9 and FIG. 14.

Each mounted blank includes tongues 8 for trans-axial connection as well as tongues 43 and cuts 44 for longitudinal connection. Additional storage spaces may be provided by longitudinally connected additional mounted blanks. This is done by placing the triangularly shaped mounted structure of the first additional mounted blank at one side the next mounted blank to be connected to, so that, similar structural mounted sections of the blanks be in the prolongation of one another and by introducing respective tongues 43 of one mounted blank into cuts 44 of the other mounted blank to connect to. When a blank is longitudinally connected, additional mounted blanks can be trans-axially and longitudinally connected to it and to the previously connected blanks trough similar repeated connecting steps as described.

When trans-axial connections are ended, section C of the last connected blank may be mounted. The second folding sequence including three consecutive folding steps and one stabilizing operation will have to take place.

The first folding step of side section C will take place by raising and inwardly folding structural panel 38 along scoring line 35 towards central section A, to a raised and internally inclined position so that its upper face presents an acute and preferably approximate sixty degree angle T in relation to the upper face of adjacent foldable joined panel 32, as seen in FIG. 14.

A second and consecutive folding step will take place as both structural panels 38 and 32, being kept in their resulted folded position will now be inwardly folded towards central section A along scoring line 34, to present a second and internal angle V preferably of sixty degrees or more between the internal faces of panels 32 and 31 creating thereby another acute angle of an approximate sixty degree position or less between the internal faces of panels 38 and 31, therefore bringing the longitudinal end edge of panel 38 near scoring line 33.

It will be seen that an internal triangular relationship has been thereby created between upper faces of panels 38,32, and 31 and that the more acute the angle T and U will be the bigger the surface space will be created for longitudinal integrated storing purposes.

A third folding step takes place as panels 38,32, and 31, being kept in their triangular resulted position will now be, inwardly folded, as a unit, along scoring line 33, towards central section A, the external bottom face of panel 38 being brought thereby to a resulted face-to-face and laying position with the upper face of the nearest part of the central section A, and the longitudinal end edge of said panel 38 pointing towards the internal folded corner along longitudinal scoring line 33 between structural panel 31 and the near side part of central section A.

Once the second folding sequence is completed, folded line 35 and three slots on panel 32 are being positioned near three tongues 8 on central section A and said tongues 8 shall be introduced into the lowest part of the slots facing them for adequate stabilization of the raised structure.

When side section C is mounted and utilized as ending means for CD storage, it will be understood that internal panel 32 of side section C is disposed to collaborate with oppositely inclined internal panel 22 of side section B for that purpose, while in the case of the other connected blanks with one-side-only mounted section B, external panel 21 of one blank is disposed to collaborate with external panel 21 of the other connected blank.

The distance between the upper sides of two opposit receiving slots is adapted to admit the width of the standard size of a CD package.

Figure 7:
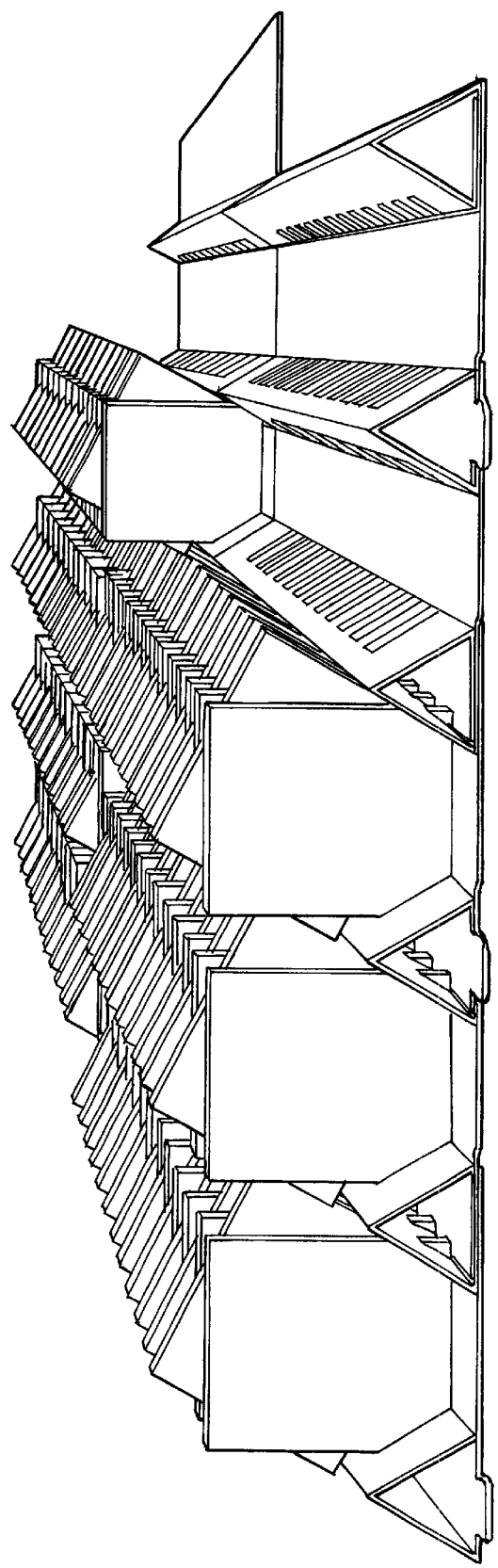
FIG. 7 is a perspective illustration of an assembly of a plurality of supports, according to the invention, connected to each other.

The first CD's to be stored are inserted vertically by two lower side portions into consecutive CD slots on two oppositely inclined panels while the supplementary CD's are stored in an inclined position laying on the upper edge 24 or 34 as appropriate between two vertically placed CD's as seen in FIG. 7 and FIG. 9.

Figure 8:
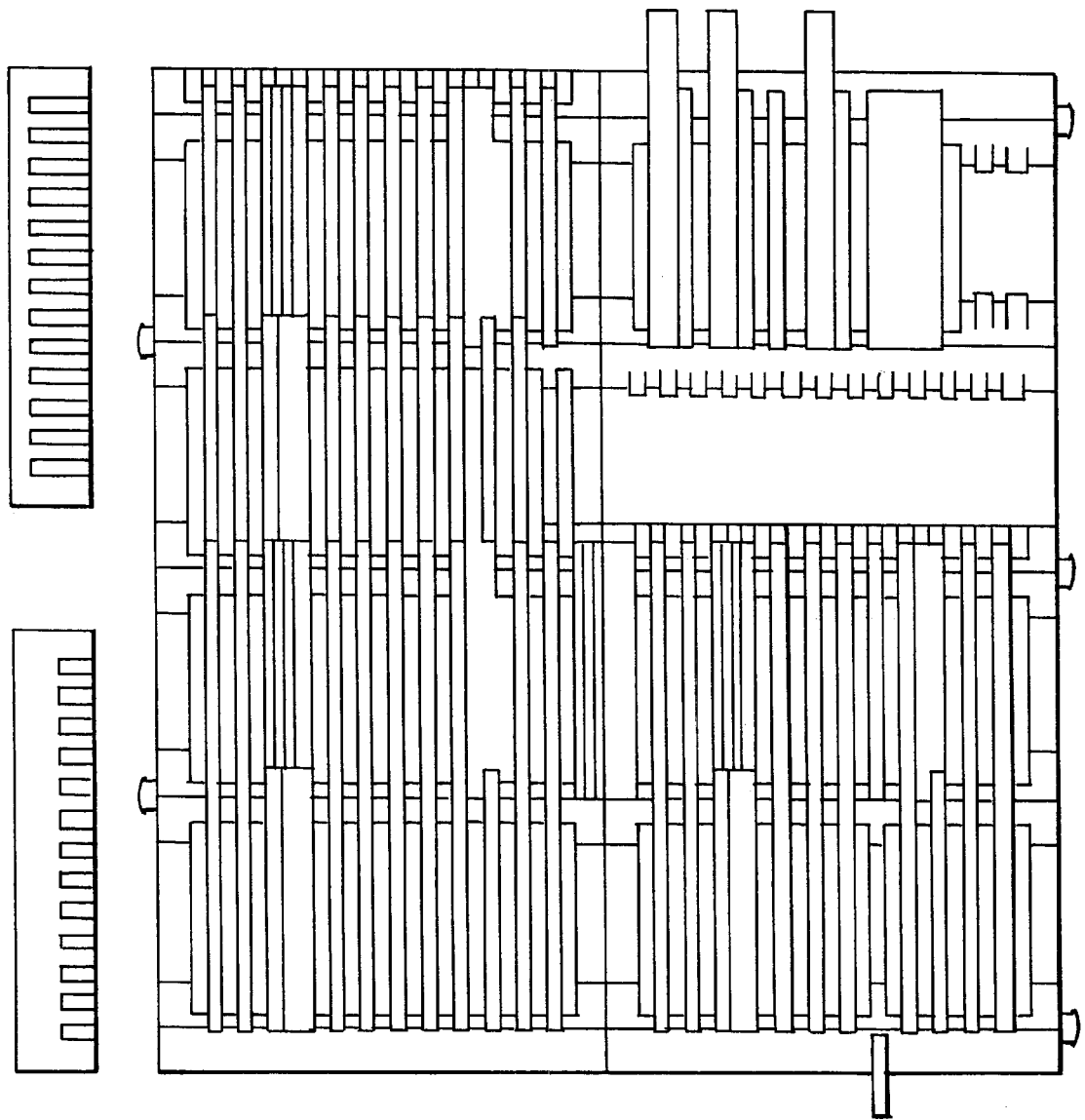
FIG. 8 is a top view of an assembly storing different items.
Figure 10:
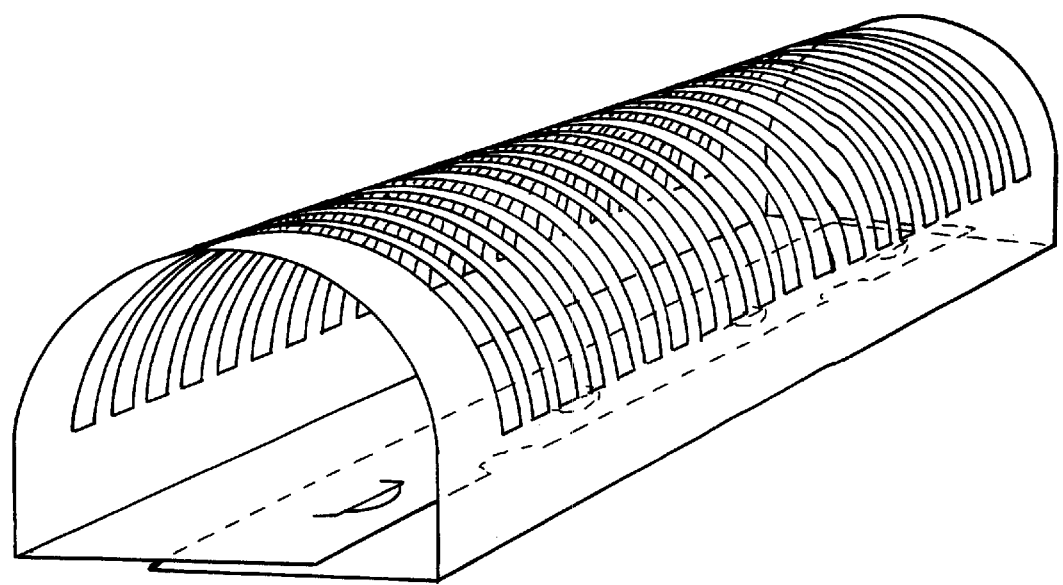
FIG. 10 illustrates a different manner of erecting a support.

When lines 24 and 34 are not scored, and respective scores 23 and 25 as well as 33 and 35 are folded to raise the structure, the result will be a shaped form of a semi circle as seen in FIG. 10 and stored inclined CDs will lay approximately near the top of the semi circle Every free pair of opposed slots intended to store one CD package, provides a space between two vertically stored CDs equal to the triple thickness of that of the standard CD package thickness for storage of various CD thickness albums as seen in FIG. 8.

Figure 1:
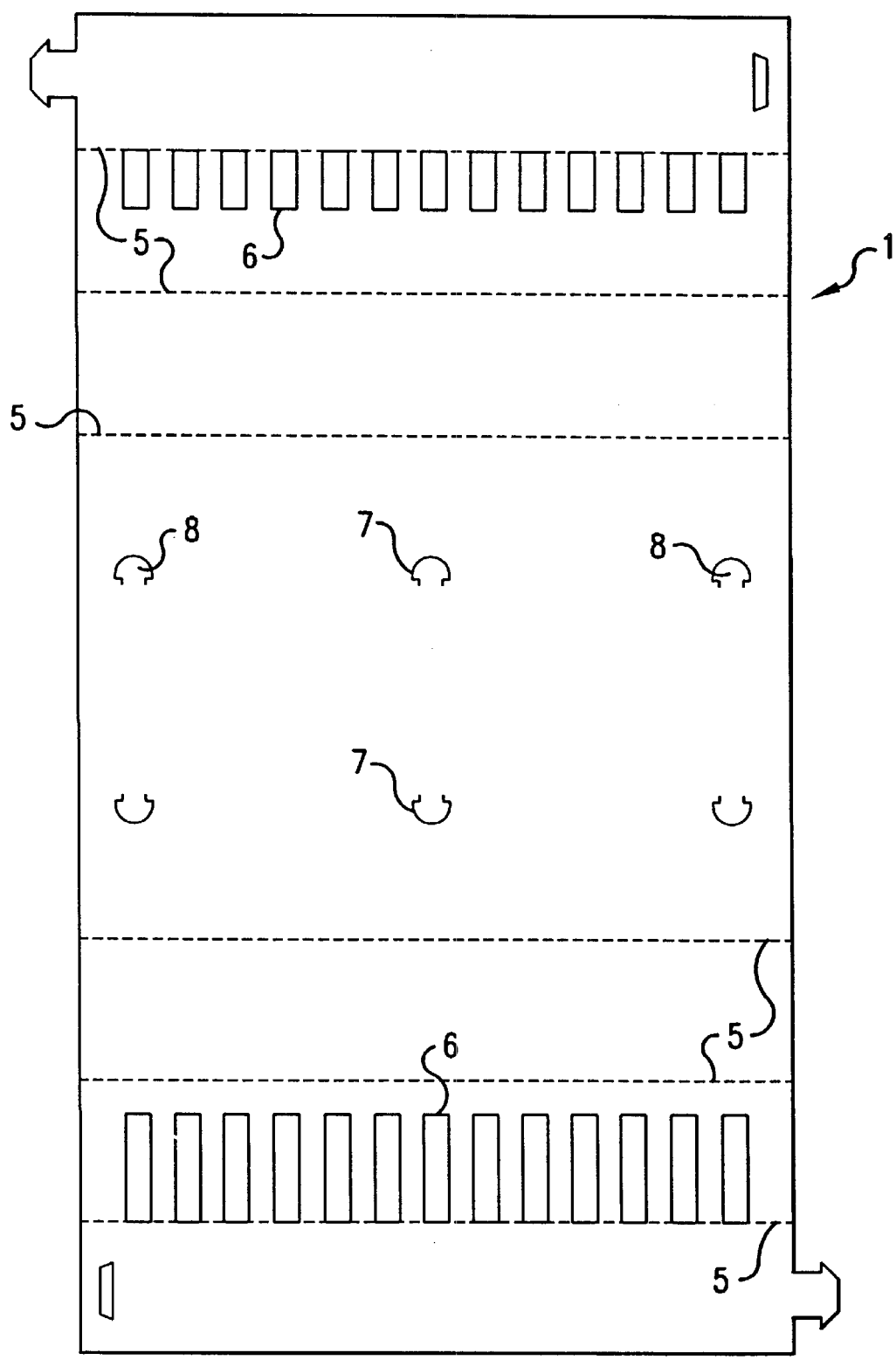
FIGS. 1,2,3,4,11,12 and 13 illustrate different embodiments of blanks from which the invention may be made.

The blank depicted in FIG. 1 is folded along folding lines 5 to form a triangle 10 which is stabilized by small tongues 8 as seen in FIG. 8.

Figure 6:
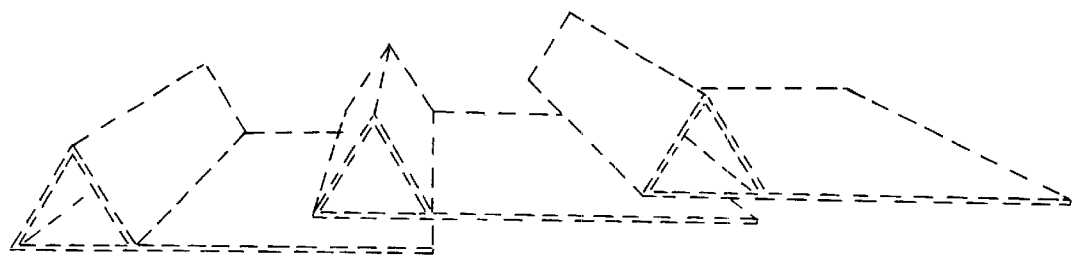
FIG. 6 is a perspective illustration of a support assembly.
Figure 6:
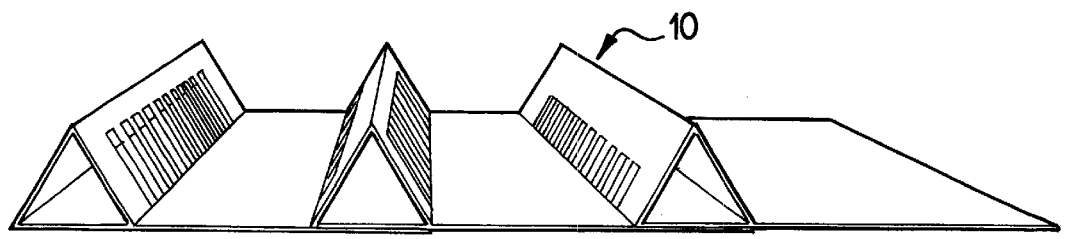

FIG. 2 illustrates a left hand side end blank 2 to be used for erecting an assembly as seen in FIG. 6.

Figure 3:
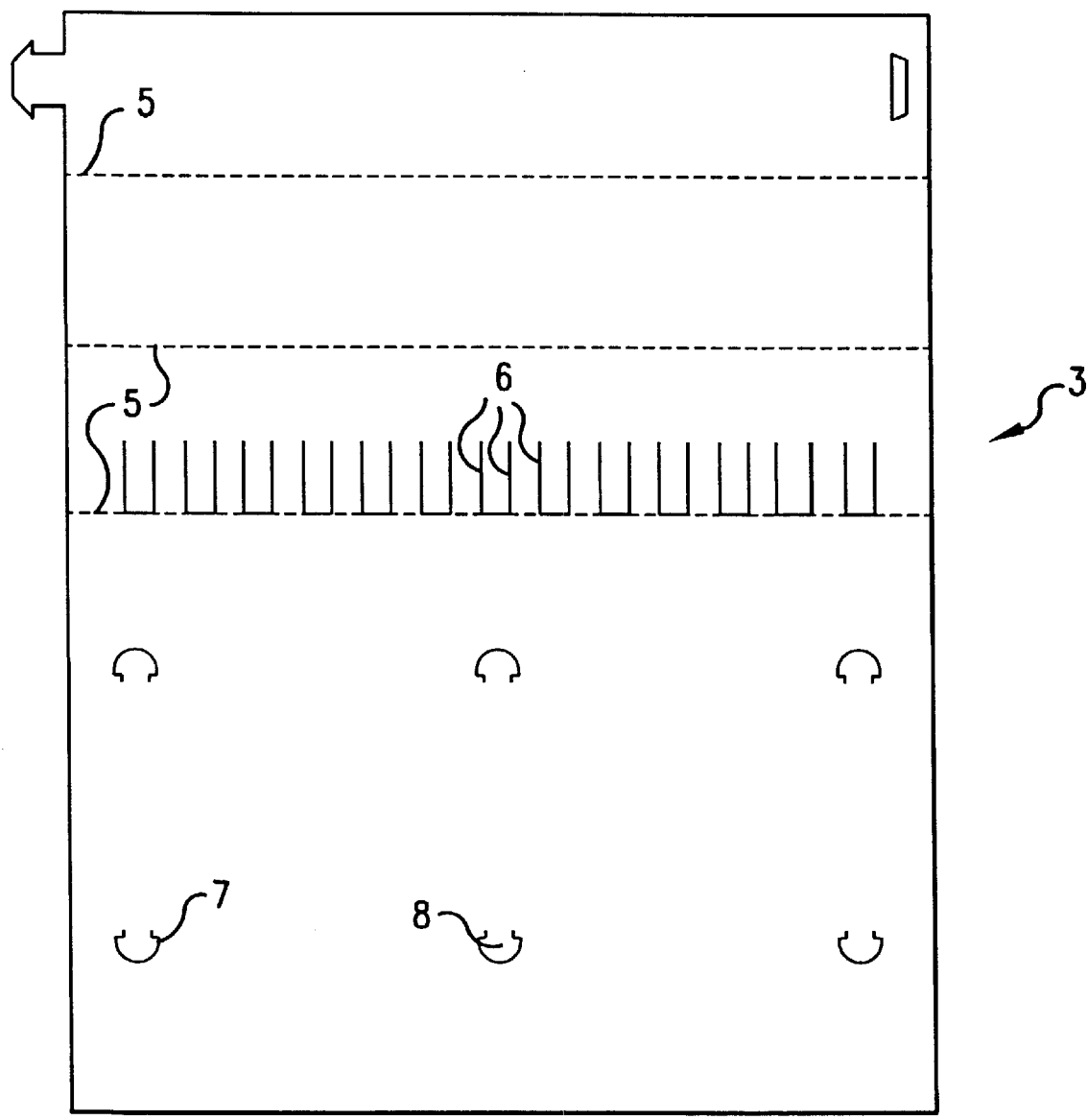

FIG. 3 illustrates a right hand side end blank 3 to be used for erecting an assembly as seen in FIG. 6.

Likewise FIG. 4 illustrates a blank 4 to be used as the middle part of an assembly as seen in FIGS. 6 and 7.

FIG. 8 demonstrates the use of an assembly for storing CD's of different thicknesses as well as video cassettes and pens receiving holes.

FIG. 9 illustrates an embodiment when a side wall of the support is used for holding pencils and part of the blank as a pad for a computer's mouse. The said pencils or the like fit with the angle at the base of the triangle, in niches of intervals 29, between two vertically inserted CD's D, as seen in FIG. 14.

FIG. 10 illustrates an embodiment of a blank where the blank is not folded to form a triangle but just rolled to form a semi circular construction.

Figure 11:
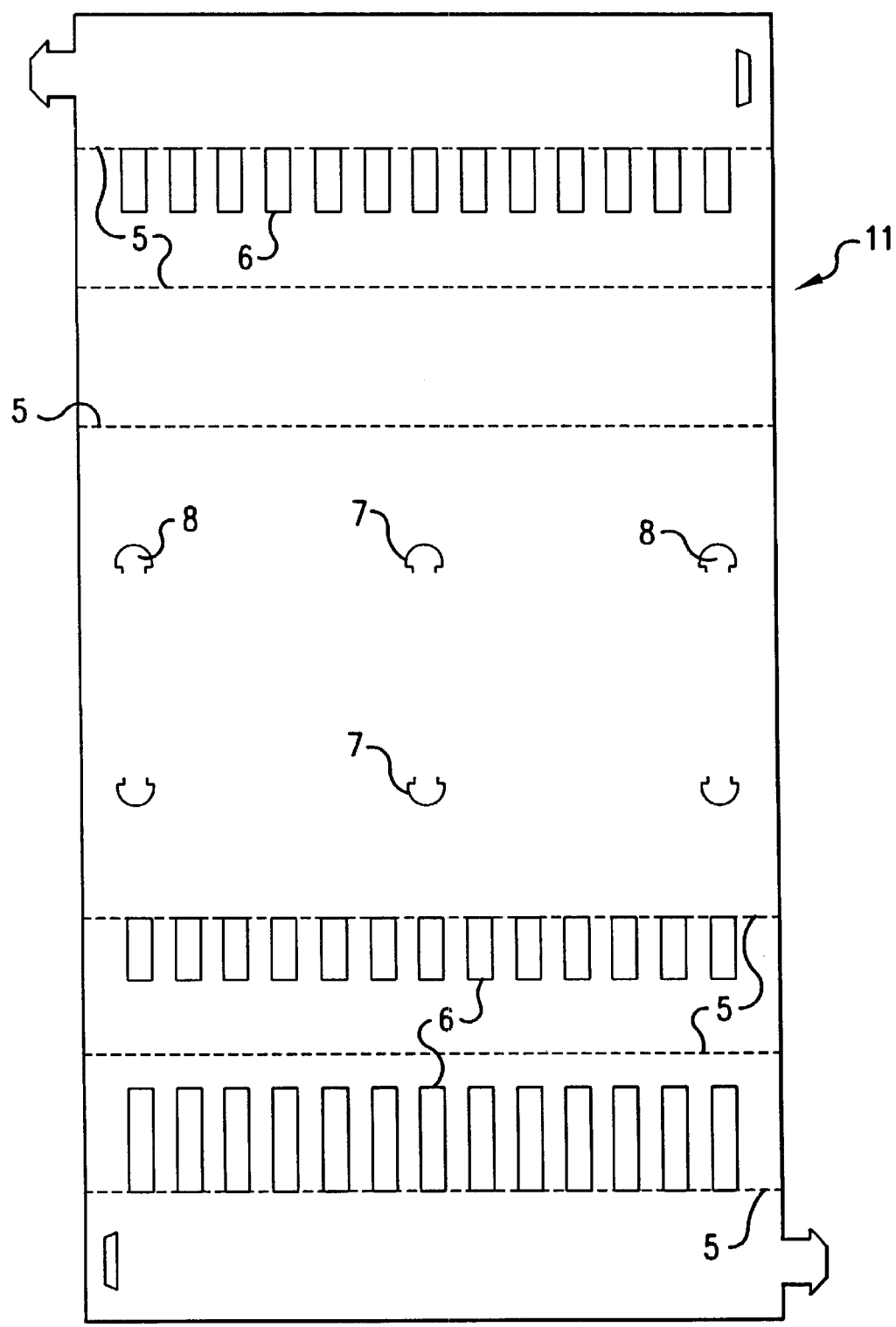

FIG. 11 illustrates an embodiment of a blank where the blank is folded along lines 5 to form a triangle at each of the two opposite sides of the device and could be used for ending an assembly as seen in FIGS. 7 and 8.

Figure 12:
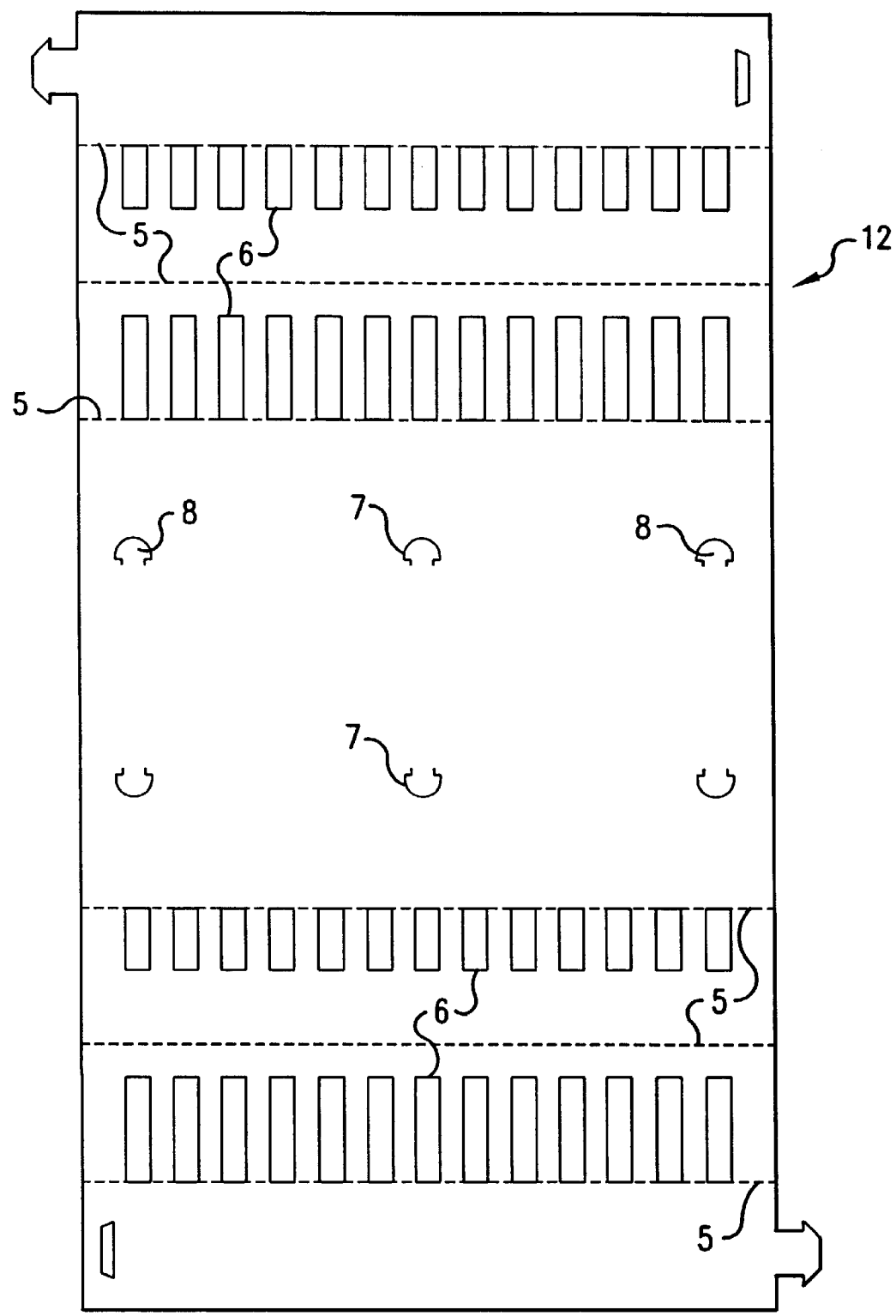

FIG. 12 illustrates an embodiment of a blank where the blank is folded along lines 5 to form a triangle at each of the two opposite sides of the device and could be used as a middle part of an assembly as seen in FIGS. 7 and 8.

Industrial applicability

The device is manufactured by die cuts which enables leaving openings of small tongues which are springy thus when the disk is placed in its vertical position it would hold the disk better in position.

According to the invention the device is made of blanks of flexible material provided with scores, cuts and holes which would enable the erecting of a flattened blank for the storing of discs and connecting a plurality of blanks together.

What is claimed is:

1. A rack for supporting and storing flat products comprising a base having a plurality of spaced apart upstanding product storing sections, each pair of product storing sections being triangular in cross-section and formed of an outer panel, an inner panel, and a base panel, said outer and inner panels being joined at a fold forming the apex of the triangle, said base panel overlapping a portion of said base, facing inner panels of adjacent product storing sections having a plurality of longitudinally spaced parallel product-receiving slots formed therein extending upwardly from its corresponding base panel and terminating short of the apex, the slots of one of said product storing sections being aligned with the slots of the other of said product storing sections.

2. A rack for supporting and storing flat products as claimed in claim 1, wherein said rack is made from a single rectangular blank which comprises a central panel and a product storing section forming portion at each end, each product storing section forming portion comprising an outer wall panel joined to said central panel by a fold line, an inner wall panel joined to said outer wall panel by a fold line, and a base panel joined to said inner wall panel by a fold line, each of said inner wall panels having a plurality of longitudinally spaced parallel product-receiving slots formed therein extending from the fold line joining the inner wall panel and the base panel and terminating short of the fold line joining the inner wall panel with the outer wall panel.

3. A rack for supporting and storing flat products as claimed in claim 1, wherein said rack is made from at least two blanks, each of which comprises a central base panel and a product storing section forming portion at one end, the product storing section forming portion comprising an outer wall panel joined to said central base panel by a fold line, an inner wall panel joined to said outer wall panel by a fold line, and a base panel joined to said inner wall panel by a fold line, said inner wall panel having a plurality of longitudinally spaced parallel product-receiving slots formed therein extending from the fold line joining the inner wall panel and the base panel and terminating short of the fold line joining the inner wall panel with the outer wall panel, said blanks being mirror images of each other and joined at their central base panels.

4. A rack for supporting and storing flat products as claimed in claim 3, comprising at least three blanks joined end-to-end thereby forming a pair of end product storing sections and at least one central product storing section, both the inner and outer walls of the central product storing sections having said slots.

5. A rack for supporting and storing flat products as claimed in claim 1, wherein rack comprises two opposed product storing sections.

6. A rack for supporting and storing flat products as claimed in claim 1, wherein said slots have a width sufficient to comfortably hold CD's.

7. A rack for supporting and storing flat products as claimed in claim 6, wherein the areas between the slots have the same width as the slots.

8. A rack for supporting and storing flat products as claimed in claim 1, wherein said slots have a width sufficient to comfortably hold CD jewel boxes.

9. A rack for supporting and storing flat products as claimed in claim 8, wherein the areas between the slots have the same width as the slots.

10. A rack for supporting and storing flat products as claimed in claim 8, wherein the slots are uniform in width.

11. A rack for supporting and storing flat products as claimed in claim 8, wherein the slots have varying widths to accommodate jewel boxes of different sizes.

12. A rack for supporting and storing flat products as claimed in claim 1, further comprising openings in at least one of said inner and outer walls of a size to hold pencils and pens.

13. A rack for supporting and storing flat products as claimed in claim 1, further comprising a panel which comprises a mouse pad.

14. A rack for supporting and storing flat products as claimed in claim 1, wherein said products are CD's.

15. A rack for supporting and storing flat products as claimed in claim 1, wherein said products are CD jewel boxes.

* * * * *